(12) United States Patent
Revelino et al.

(10) Patent No.: US 11,124,107 B2
(45) Date of Patent: Sep. 21, 2021

(54) SLIDE-OUT ROOM MECHANISM WITH RACK AND PINION DRIVE

(71) Applicant: LCI Italy s.r.l., Florence (IT)

(72) Inventors: Lawrence Revelino, Norco, CA (US); Rupert Wilkins, Norwich (GB); Fabio Romagnoli, Florence (IT)

(73) Assignee: LCI Italy s.r.l., Florence (IT)

(*) Notice: Subject to any disclaimer, the term of this patent is extended or adjusted under 35 U.S.C. 154(b) by 237 days.

(21) Appl. No.: 16/528,786

(22) Filed: Aug. 1, 2019

(65) Prior Publication Data

US 2020/0369193 A1 Nov. 26, 2020

(30) Foreign Application Priority Data

May 20, 2019 (IT) .......................... 102019000007030

(51) Int. Cl.
*B60P 3/34* (2006.01)
*F16H 19/04* (2006.01)

(52) U.S. Cl.
CPC ................. *B60P 3/34* (2013.01); *F16H 19/04* (2013.01)

(58) Field of Classification Search
CPC .................................. B60P 3/34; F16H 19/04
USPC ....................................................... 296/26.01
See application file for complete search history.

(56) References Cited

U.S. PATENT DOCUMENTS

| | | |
|---|---|---|
| 6,428,073 B1 | 8/2002 | Blodgett, Jr. |
| 7,234,747 B2 | 6/2007 | Rasmussen |
| 7,374,218 B2 | 5/2008 | Schneider |
| 7,588,279 B2 | 9/2009 | Rasmussen |
| 8,016,343 B2 | 9/2011 | Schwindaman et al. |
| 8,235,455 B2 | 8/2012 | Schwindaman et al. |
| 8,240,744 B2 | 8/2012 | Schwindaman et al. |
| 8,317,250 B2 | 11/2012 | Schwindaman et al. |
| RE44,002 E | 2/2013 | Schwindaman et al. |
| 8,573,666 B2 | 11/2013 | Schwindaman et al. |
| 8,840,164 B2 | 9/2014 | Yoder et al. |
| 8,925,990 B2 | 1/2015 | Yoder et al. |
| 8,991,890 B2 | 3/2015 | Kreil |
| 9,007,012 B2 | 4/2015 | Schwindaman et al. |
| 9,050,923 B1 | 6/2015 | Garceau et al. |
| 9,193,291 B2 | 11/2015 | Schwindaman et al. |
| 9,366,325 B2 | 6/2016 | Yoder et al. |

(Continued)

FOREIGN PATENT DOCUMENTS

| | | |
|---|---|---|
| EP | 2 343 214 | 7/2011 |
| EP | 2 733 016 | 5/2014 |
| WO | WO 2016/159769 | 10/2016 |

OTHER PUBLICATIONS

Australian Examination Report No. 1 dated Apr. 9, 2020 issued in Australian Patent Application No. 2019205986, 6 pp.

(Continued)

*Primary Examiner* — Pinel E Romain
(74) *Attorney, Agent, or Firm* — Nixon & Vanderhye P.C.

(57) ABSTRACT

A drive mechanism for a slide-out room includes top and bottom gear racks secured on sidewalls of the room. A motor is fixed relative to the slide-out room adjacent the sidewall. A drive shaft is coupled with the motor and engages both of a first drive gear and a second drive gear, respectively engaged with the top and bottom gear racks. The gear racks are covered by a suitable cover, and the drive gears extend through the covers into engagement with the racks.

12 Claims, 6 Drawing Sheets

(56) References Cited

U.S. PATENT DOCUMENTS

| | | | |
|---|---|---|---|
| 9,545,870 B2 | 1/2017 | Walls | |
| 9,694,733 B2 | 7/2017 | Schwindaman et al. | |
| 10,093,219 B2 | 10/2018 | Schwindaman et al. | |
| 10,480,627 B1 * | 11/2019 | Vroom | ................ B60P 3/34 |
| 2015/0040700 A1 | 2/2015 | Walls | |

OTHER PUBLICATIONS

Extended European Search Report dated Apr. 28, 2020 issued in European Patent Application No. 19196246.3, 9 pp.

\* cited by examiner

SLIDE-OUT ROOM MECHANISM WITH RACK AND PINION DRIVE

CROSS-REFERENCES TO RELATED APPLICATIONS

This application claims the benefit of Italian Patent Application No. 102019000007030, filed May 20, 2019, the entire content of which is herein incorporated by reference.

STATEMENT REGARDING FEDERALLY SPONSORED RESEARCH OR DEVELOPMENT (NOT APPLICABLE)

BACKGROUND

The invention relates to a slide-out or retractable room for mobile living quarters, such as a recreational vehicle.

Recreational vehicles, such as motor homes, fifth-wheel trailers, and travel trailers may be provided with a retractable or slide-out room for increasing the living space of the vehicle. The retractable or slide-out room is extended for use when the vehicle is parked and is retracted into the main living area of the vehicle when the vehicle is in transit. Slide-out rooms typically require substantial space for mounting large electrical motors and hydraulic units that require the construction of expensive covers and thus reduce the overall space inside the vehicle.

Existing mechanisms for extending and retracting slide-out rooms utilize a drive screw that is designed to stay in tension. When improperly constructed, the screw can compress, which causes the screw to bow and contact the housing. Additionally, it is typical for the motor on the screw drive to move with the room, which also requires the wires to move.

Other problems with existing systems include undesirably exposed operating components when the room is expanded as well as inadequate sealing during transition between retracted and expanded positions.

BRIEF SUMMARY

It would thus be desirable for a slide-out room system that overcomes the shortcomings of existing systems. In some embodiments, the drive system for the slide-out room may utilize a rack and pinion drive system to eliminate use of the conventional drive screw. Actuating mechanisms may be installed on opposite side walls of the slide-out room and the adjoining portions of the wall of the main living area through which the slide-out room extends and retracts. Each of the actuating assemblies include a pair of pinion gears mounted on a rotatable torque shaft/drive shaft, which are supported for rotation in the main living quarters adjacent the opening in the wall of the main living quarters through which the slide-out room extends and retracts. The two pinion gears are meshed with the teeth of corresponding gear racks, which are mounted on the adjacent sidewall of the slide-out room. The gear racks may be covered with respective cover members through which the pinion gears extend to engage the racks.

BRIEF DESCRIPTION OF THE DRAWINGS

These and other aspects and advantages will be described in detail with reference to the accompanying drawings, in which.

DETAILED DESCRIPTION

Figure 1:
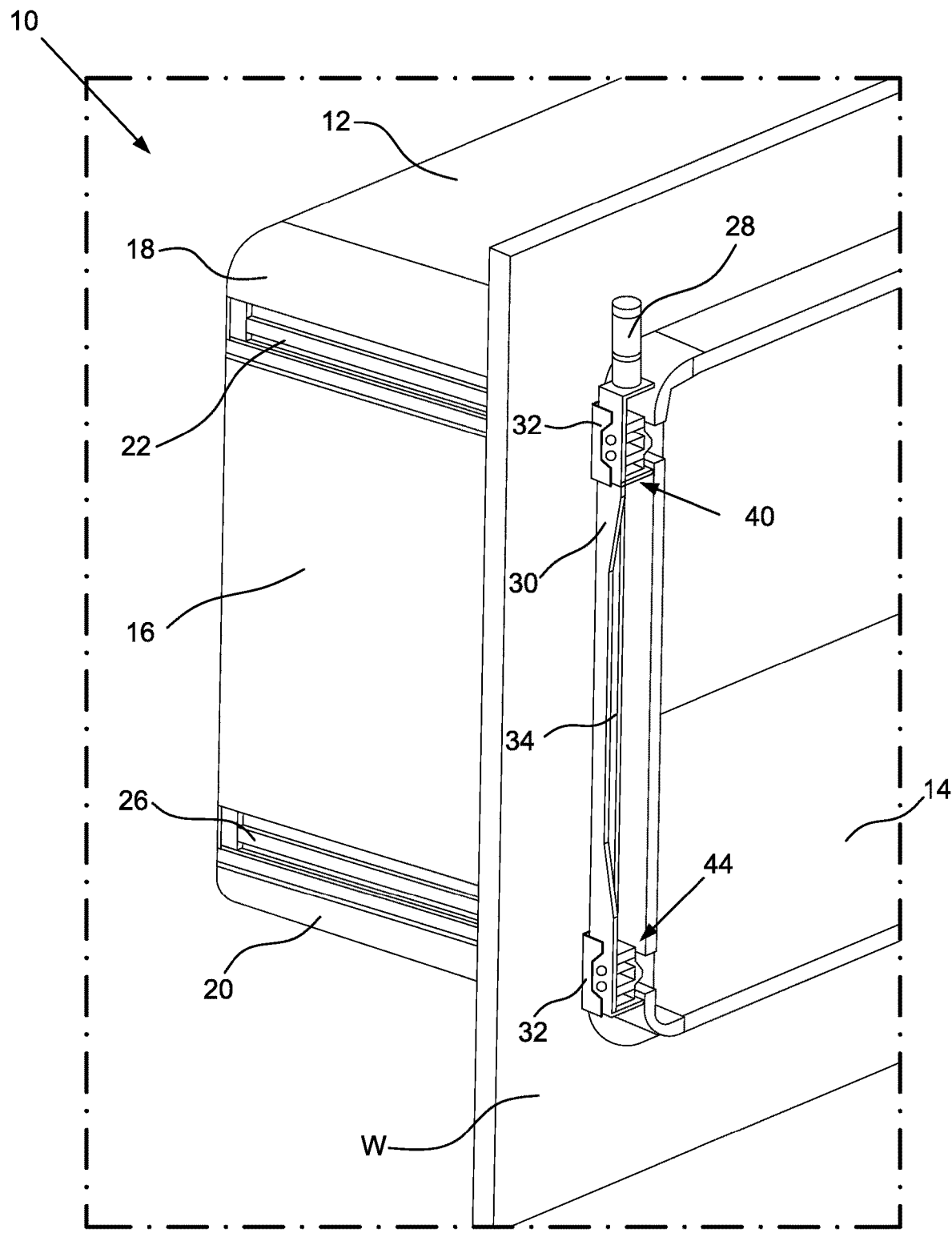
FIG. 1 is a perspective view showing the drive mechanism and slide-out room with the slide-out room in an extended position.

FIG. 1 is a perspective view of a slide-out room system 10 for a vehicle. The system 10 includes a room defined by a top wall 12, a floor 14 and a pair of sidewalls 16 connected between the top wall 12 and the floor 14. In FIG. 1, the slide-out room is shown in an extended or expanded position. The slide-out room extends through an opening in a wall W typically in the side of the vehicle. The view in FIG. 1 shows an interior of the vehicle wall W.

Components of the drive mechanism will be described with reference to the side wall 16 shown in FIG. 1, it being understood that identical components for the drive mechanism are associated with the opposite sidewall.

First or upper corner brackets 18 are provided at an intersection of each of the sidewalls 16 and the top wall 12, and second or lower corner brackets 20 are provided at an intersection of each of the sidewalls 16 and the bottom wall 14. In some embodiments, the corner brackets 18, 20 provide a rounded transition between the top wall 12 and the sidewalls 16 and between the bottom wall 14 and the sidewalls 16, respectively.

Figure 4:
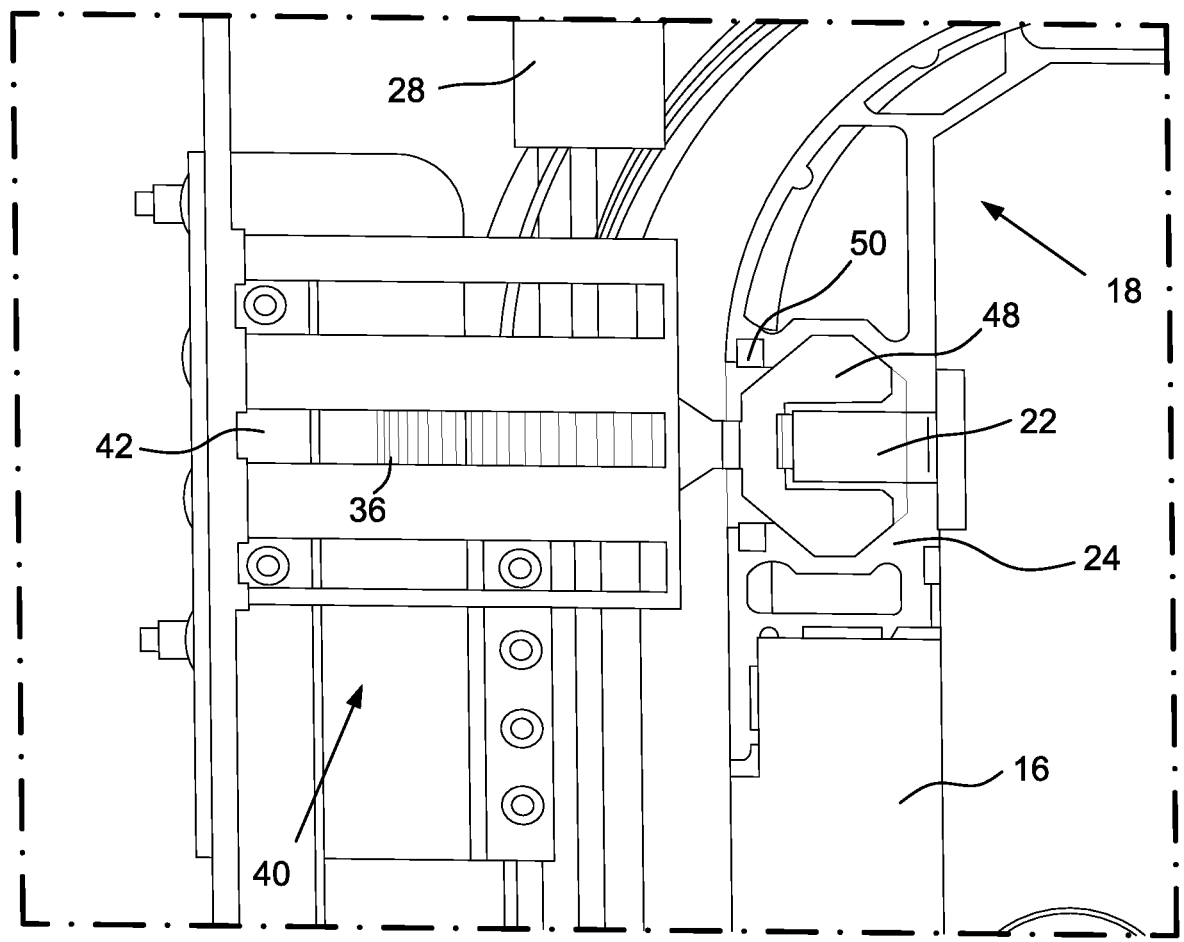
FIG. 4 is a sectional view through one corner of the drive mechanism components.

A first or upper horizontal gear rack 22 is secured on the sidewall 16 via a channel 24 in the corner bracket 18 (see FIG. 4). A second or lower horizontal gear rack 26 is spaced from the first horizontal gear rack 22 and is secured on the sidewall 16 via a similar channel in the lower corner bracket 20.

Inside the vehicle on an interior of the vehicle wall W, a motor 28 is fixed to the wall W via a motor bracket 30 and anchor brackets 32. The motor 28 is thus fixed to the wall W relative to the slide-out room adjacent the sidewall 16. A fluted motor shaft or drive shaft 34 is coupled with the motor 28 for rotation by the motor.

The drive shaft 34 extends through a correspondingly shaped opening in a first drive gear 36 that engages the first horizontal gear rack 22. The drive shaft 34 also extends through a second drive gear 38 engaging the second horizontal gear rack 26.

Figure 2:
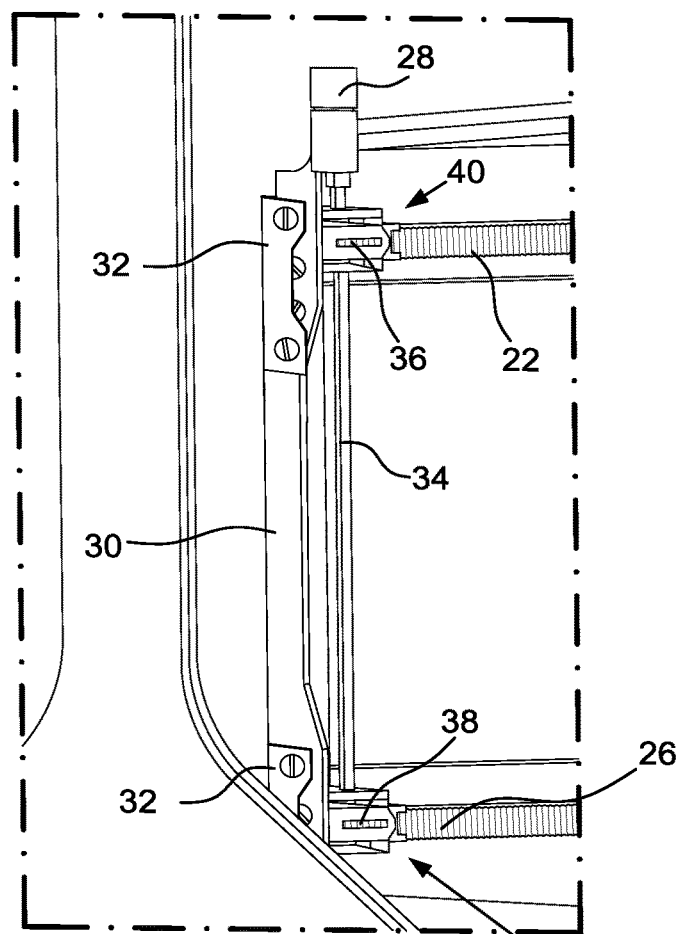
FIG. 2 shows components of the drive mechanism with the slide-out room in a retracted position.
Figure 3:
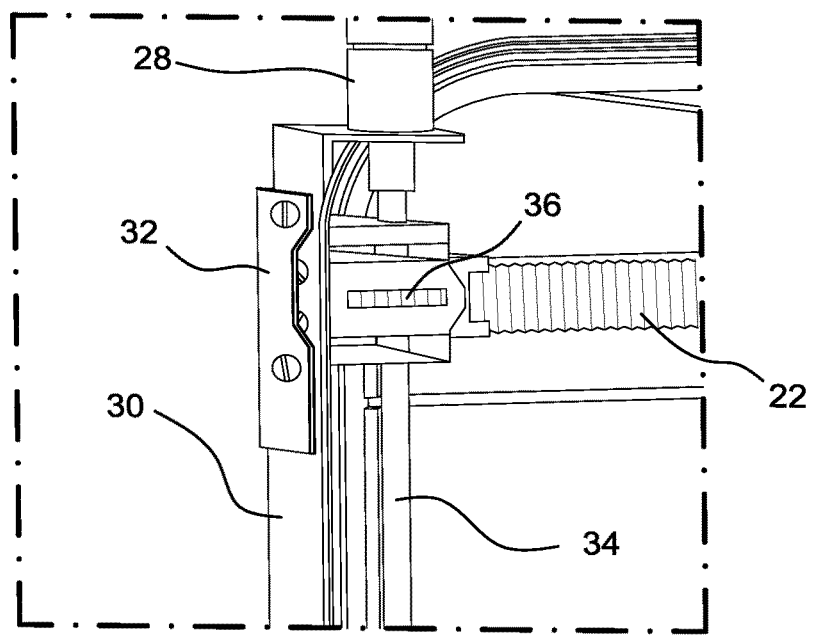
FIG. 3 shows one corner of the slide-out room and the components of the drive mechanism.
Figure 5:
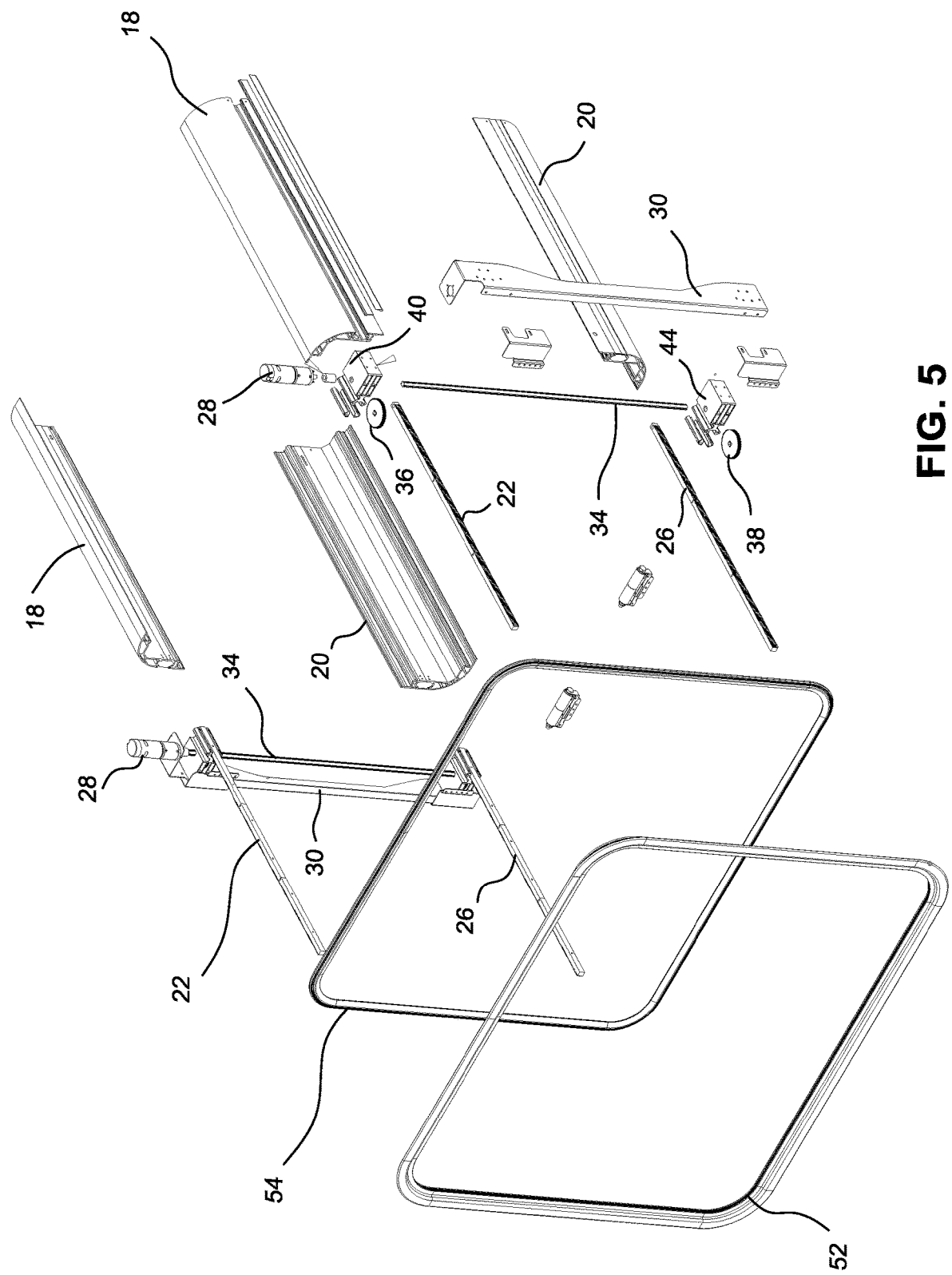
FIG. 5 is an exploded view of the slide-out room system.
Figure 6:
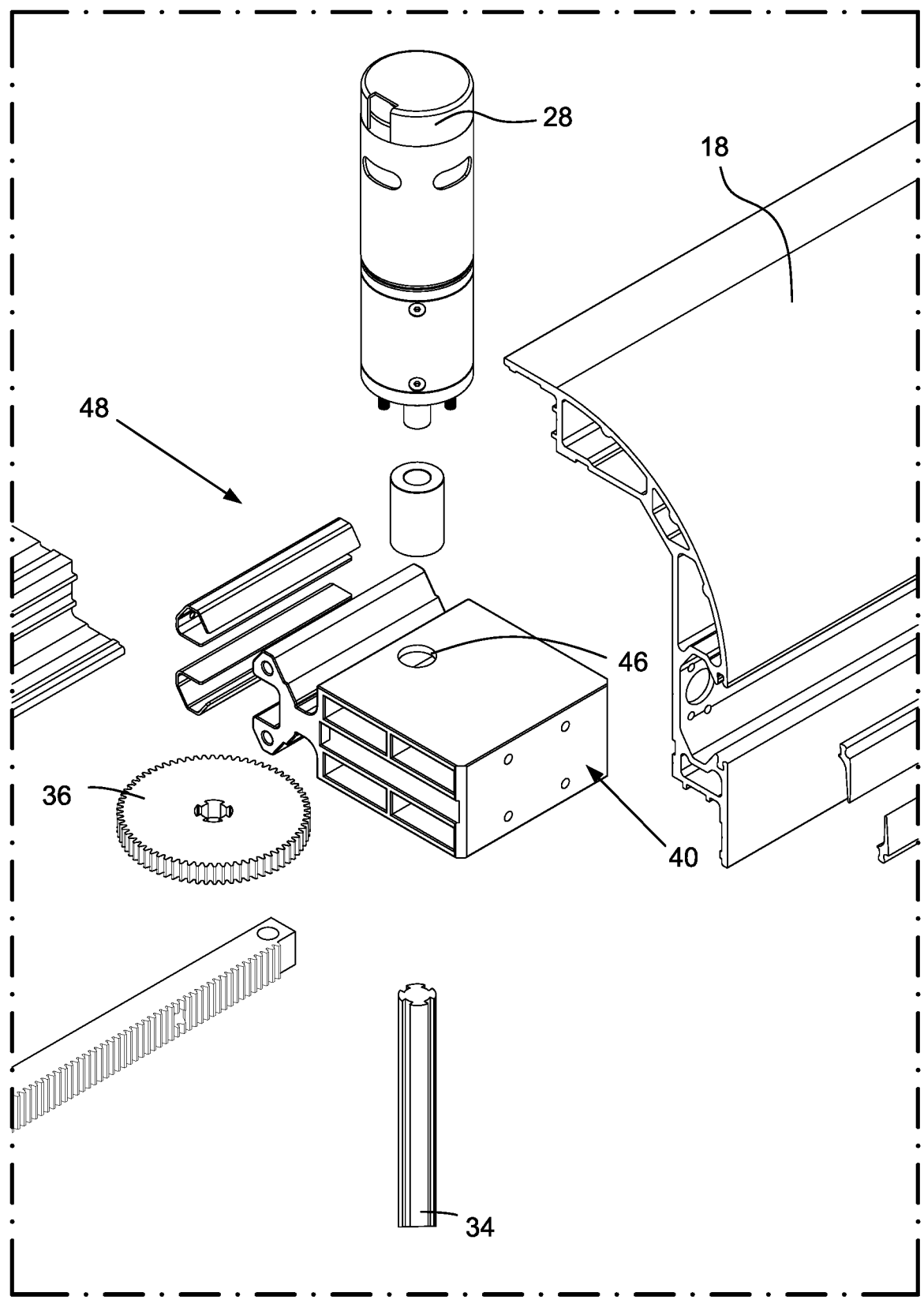
FIG. 6 is an exploded view of an upper corner showing the drive mechanism components.
Figure 7:
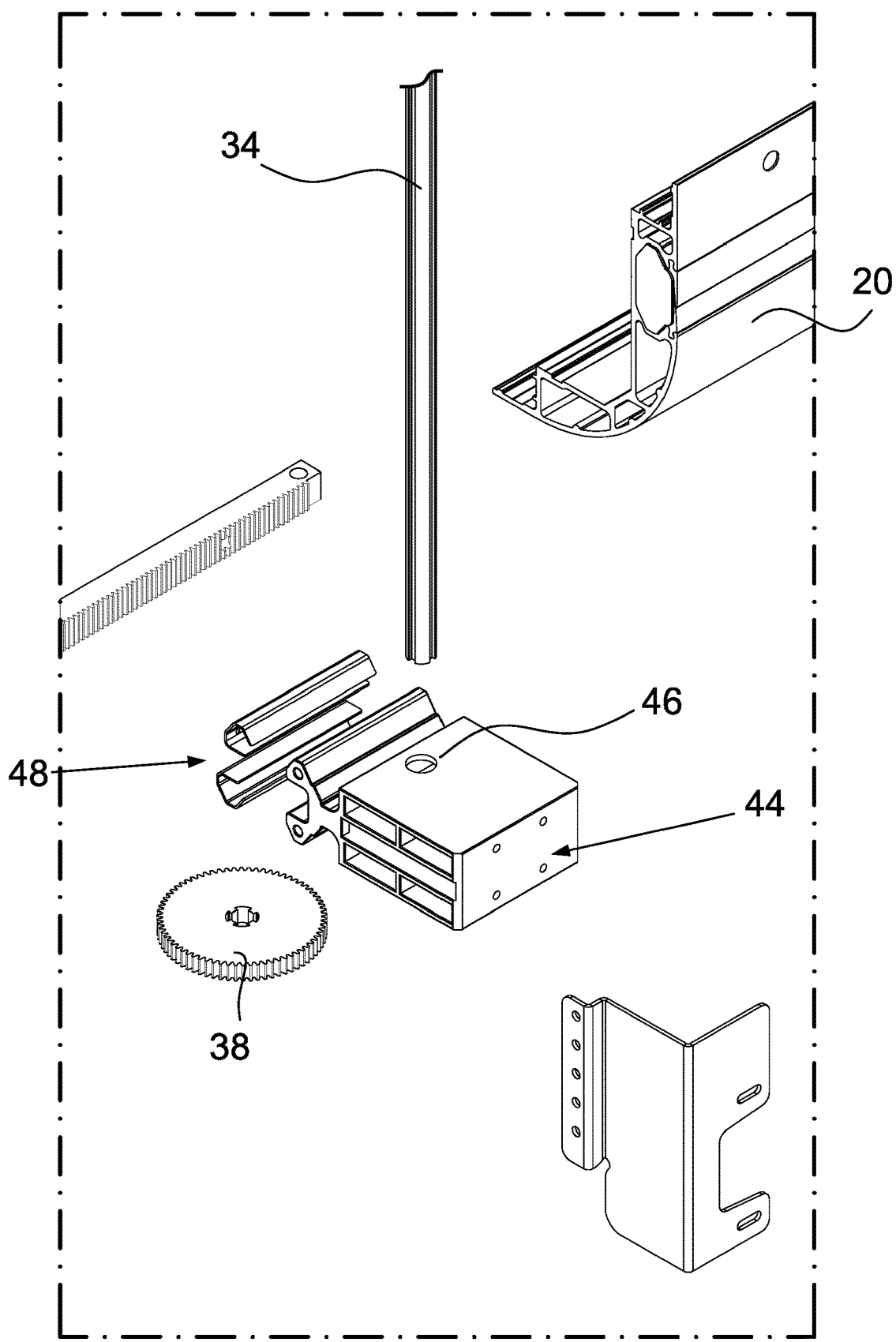
FIG. 7 is an exploded view showing a lower corner of the drive mechanism components.

A gear housing 40 is fixed to the wall W of the vehicle adjacent the sidewall 16 of the slide-out room. The gear housing 40 includes a first compartment 42 in which the first drive gear 36 is disposed. A second gear housing 44 (see FIGS. 1 and 2) similarly includes a compartment in which the second drive gear 38 is disposed. As shown in FIGS. 5-7, the gear housings 40, 44 include a hole 46 therethrough, where the drive shaft 34 is positioned through the holes 46 in the first and second gear housings and through the first 36 and second 38 drive gears.

With continued reference to FIG. 4, a slider 48 may be secured to each of the first gear housing 40 and the second gear housing 44. The sliders 48 respectively engage exterior surfaces of the first 22 and second 26 horizontal gear racks. As shown in FIGS. 6 and 7, the sliders 48 may be formed in multiple pieces. The drive gears 36, 38 are positioned through an opening in each of the sliders 48, respectively.

A cover 50 is secured in suitable channels of the corner brackets 18, 20 and is positioned over each of the first horizontal gear rack 22 and the second horizontal gear rack 26. The covers 50 conceal the gear racks 22, 26. As shown in FIG. 4, the drive gears 36, 38 extend through the covers 50 into engagement with the first and second horizontal gear racks 22, 26, respectively. The covers 50 cover the entire lengths of the respective horizontal gear racks 22, 26.

FIG. 5 is an exploded view showing the components of the slide-out room system. A narrow frame member 52 is secured in the opening in the vehicle wall W, and a seal member such as a V-shaped seal or "V seal" 54 is positioned between the narrow frame 52 and the slide-out room. Since the frame 52 and seal 54 are fixed in the vehicle opening, the slide-out room is displaceable relative to the seal 54, and the slide-out room remains sealed in the retracted position, the extended position and while transitioning between the retracted and extended positions.

As described, electric motors 28 are connected to drive gears 36, 38 that engage the first and second gear racks 22, 26 respectively, driving movement of the slide-out room. This movement may be distributed or synchronized with the lower portion of the room with the first drive gear 36 engaged with the first gear rack 22 and the second drive gear 38 engaged with the second gear rack 26. In some embodiments, the drive shaft 34 may not be directly connected to the motor 28 such that the drive shaft 34 acts solely as a secondary synchronization mechanism between the top and bottom of the room. An equalizing or synchronizing assembly that transfers some of the force/movement delivered to the lower portion of the slide-out room to the upper portion of the room is described in U.S. Pat. No. 9,221,378, the contents of which are hereby incorporated by reference.

The use of a rack and pinion drive eliminates problems with existing systems utilizing a drive screw. Another advantage is the use of two motors rather than four motors. A drive shaft connects two sets of gearing for each of the two motors. Moreover, the motors are fixed relative to the slide-out room and thus do not move with the room, resulting in a simplified and more reliable assembly.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A drive mechanism for a slide-out room, the drive mechanism comprising:
    a first horizontal gear rack secured on a sidewall of the slide-out room;
    a second horizontal gear rack spaced from the first horizontal gear rack and secured on the sidewall of the slide-out room;
    a motor fixed relative to the slide-out room adjacent the sidewall of the slide-out room;
    a drive shaft coupled with the motor;
    a first drive gear coupled with the drive shaft and engaging the first horizontal gear rack;
    a second drive gear coupled with the drive shaft and engaging the second horizontal gear rack;
    a first cover positioned over the first horizontal gear rack; and
    a second cover positioned over the second horizontal gear rack,
    wherein the first drive gear extends through the first cover into engagement with the first horizontal gear rack, and wherein the second drive gear extends through the second cover into engagement with the second horizontal gear rack.

2. A drive mechanism according to claim 1, further comprising a first gear housing fixed relative to the slide-out room adjacent the sidewall of the slide-out room and a second gear housing fixed relative to the slide-out room adjacent the sidewall of the slide-out room, the first gear housing including a first compartment, and the second gear housing including a second compartment, wherein the first drive gear is disposed in the first compartment, and the second drive gear is disposed in the second compartment.

3. A drive mechanism according to claim 2, wherein the first and second gear housings include a hole therethrough, and wherein the drive shaft is positioned through the holes in the first and second gear housings and through the first and second drive gears.

4. A drive mechanism according to claim 2, further comprising a slider secured to each of the first gear housing and the second gear housing, the sliders respectively engaging exterior surfaces of the first and second horizontal gear racks.

5. A drive mechanism according to claim 4, wherein the first and second drive gears are positioned through an opening in each of the sliders, respectively.

6. A drive mechanism according to claim 1, further comprising a slider engaging exterior surfaces of each of the first and second horizontal gear racks.

7. A drive mechanism according to claim 6, wherein the first and second drive gears are positioned through an opening in each of the sliders, respectively.

8. A drive mechanism according to claim 1, wherein the first cover and the second cover are secured in respective corner brackets of the slide-out room.

9. A slide-out room system for a vehicle, the slide-out room system comprising:
    a room defined by a top wall, a floor, and a pair of sidewalls connected between the top wall and the floor;
    a first horizontal gear rack secured on each sidewall of the room;
    a second horizontal gear rack spaced from the first horizontal gear rack and secured on each sidewall of the room;
    a motor fixed relative to the room adjacent each sidewall of the room;
    a drive shaft coupled with each of the motors;
    a first drive gear coupled with each of the drive shafts and engaging the first horizontal gear racks, respectively;
    a second drive gear coupled with each of the drive shafts and engaging the second horizontal gear racks, respectively;
    a first cover positioned over each of the first horizontal gear racks; and
    a second cover positioned over each of the second horizontal gear racks,
    wherein the first drive gears extend through the first covers into engagement with the first horizontal gear racks, and wherein the second drive gears extend through the second covers into engagement with the second horizontal gear racks.

10. A slide-out room system according to claim 9, wherein the room includes first corner brackets at an intersection of each of the sidewalls with the top wall and second corner brackets at an intersection of each of the sidewalls with the bottom wall, the first corner brackets comprising a first channel respectively housing the first horizontal gear racks, and the second corner brackets comprising a second channel respectively housing the second horizontal gear racks.

11. A slide-out room system according to claim 10, wherein the first covers are secured in the first corner brackets adjacent the first horizontal gear racks, and wherein the second covers are secured in the second corner brackets adjacent the second horizontal gear racks.

12. A slide-out room system according to claim 10, wherein the first corner brackets and the second corner brackets are rounded.

* * * * *